Nov. 16, 1965 A. N. SWEENY 3,217,569
METAL CUTTING TOOL
Filed May 7, 1963
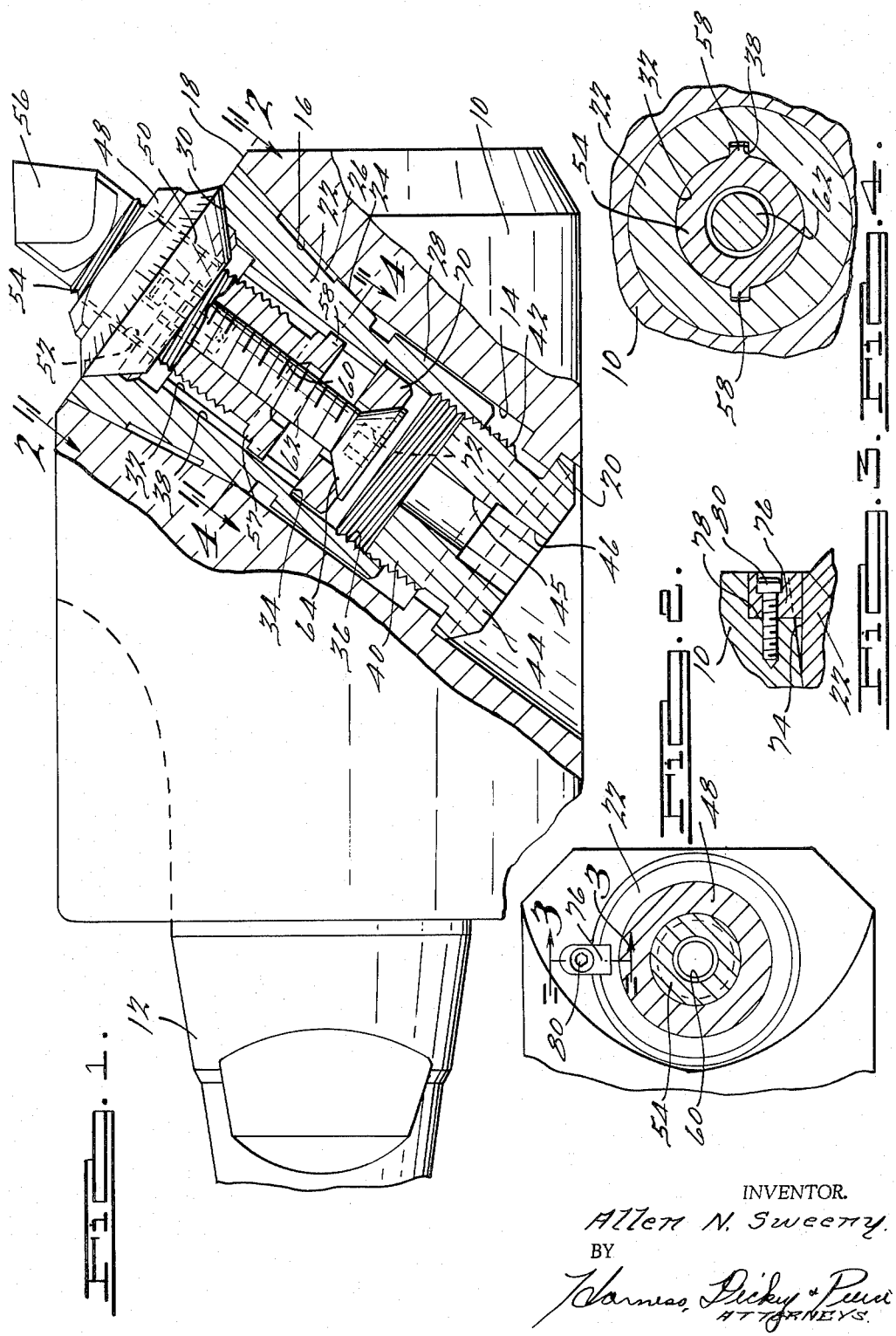
INVENTOR.
Allen N. Sweeny.
BY
Harness, Dickey & Pierce.
ATTORNEYS.

United States Patent Office 3,217,569
Patented Nov. 16, 1965

3,217,569
METAL CUTTING TOOL
Allen N. Sweeny, Grosse Pointe, Mich., assignor to De Vlieg Machine Company, Royal Oak, Mich., a corporation of Michigan
Filed May 7, 1963, Ser. No. 278,614
9 Claims. (Cl. 77—58)

This invention relates to metal cutting tools and particularly to a single point adjustable metal cutting tool for use in boring and other machining operations.

It is an object of the present invention to provide a metal cutting tool which may be preset or ground to a given dimension in a special fixture and thereafter installed in the boring bar or other tool holder with the cutting edge of the tool being located in the preselected dimensional position in a highly precise and accurate manner.

It is another object of the present invention to provide a metal cutting tool of the above character having an adjustable assembly provided with a cutter element which may be conveniently adjusted to position its cutting edge in a selected location, wherein substantially all inaccuracies resulting from the movement of the parts of the adjustable assembly may be eliminated in presetting or grinding the cutting edge to a selected dimension or position.

It is a further object of the present invention to provide a metal cutting tool of the above character which is convenient to use, which is sturdy and rugged in construction, which may be fabricated at a reasonable cost and which possesses a long, useful life.

These and other objects of the present invention will become apparent from the following detailed description, taken in conjunction with the accompanying drawings, wherein:

FIGURE 1 is a side elevational view, partly in section and with parts broken away, of a metal cutting tool embodying the features of the present invention;

FIG. 2 is a sectional view of the structure illustrated in FIG. 1 taken along the line 2—2 thereof;

FIG. 3 is a sectional view of the structure illustrated in FIG. 2, taken along the line 3—3 thereof; and FIG. 4 is a sectional view of the structure illustrated in FIG. 1, taken along the line 4—4 thereof.

Referring now to the drawings, a metal cutting tool embodying the features of the present invention is illustrated as including a tool holder or body in the form of a boring bar 10 having a fragmentarily illustrated shank 12 by which the boring bar 10 is held in the spindle of a machine tool (not shown) for rotation about its longitudinal axis. The boring bar 10 is formed with an opening 14 extending angularly transversely therethrough. While the opening 14 is of cylindrical shape over most of its length, a conical seat 16 is formed at one end of the opening 14 in coaxial relation therewith. The seat 16 is open to the exterior of the bar 10 at its large diameter end, which is surrounded by a flat annular surface 18. The opening 14 is also open to the exterior of the bar 10 at the end thereof opposite the seat 16 and is formed with an annular shoulder portion 20 extending radially inwardly from the wall of the opening 14 in a plane perpendicular to the axis of the opening 14. It will be seen that the shoulder portion 20 is spaced inwardly a short distance from the end of the opening 14 opposite the seat 16.

The opening 14 and the seat 16 are adapted to receive a bushing or sleeve 22 having an outer conical bearing surface or seat 24 which bears against the conical seat 16. The surface 24 has a groove or recess 26 at its mid-portion, providing clearance with the surface of the seat 16. This reduces the area of the surface 24 which must be accurately ground to mate with the seat 16 and reduces surface friction between the seat 16 and surface 24 during removal or insertion of the bushing 22. It also provides two spaced annular segments of the surface 24, which assure that the bushing 22 will not rock or tilt with respect to the axis of the seat 16. A sleeve or hollow extension portion 28 projects from the rear of the bushing 22 into the opening 14. The extension 28 is of external cylindrical shape, as is the opening 14, but a slight clearance is provided between the two to assure that the bushing 22 is positioned solely by the interengagement of the surface 24 and seat 16. The bushing 22 is internally open to provide a conical seat 30 at its forward end and a cylindrical bore 32 having a rearwardly facing annular shoulder 34 at its rear end at the forward end of the sleeve portion 28. The inner diameter of the sleeve portion 28 is threaded, as indicated at 36, while the bore 32 is provided with keyway means which in the illustrated embodiment comprise a pair of oppositely disposed axially extending keyways 38. The bushing 22 is held in a seated position against the conical seat 16 by the application of a force parallel to the axis of the seat. This face is provided by a plug or enlarged screw 40 having a threaded shank portion 42 threaded into the bushing threads 36 and a head 44 bearing against the shoulder portion 20. The screw 40 has a central opening 45 provided with an enlarged socket portion 46 of polygonal cross section at the head thereof. The opening 45 is centered with respect to the axis of the tool and provides access to the structure which will be subsequently described.

While the bushing 22 may be used to support a variety of different tools, it finds advantageous use in supporting an adjustable tool assembly of the type illustrated, which is an assembly of the general type shown in U.S. Patent No. 2,537,517. This assembly includes a graduated adjusting collar or nut 48 having a conical surface 50 seating against the conical seat 30 and a threaded bore 52 which receives and supports a threaded cutter element or shank 54. The shank 54 has a tip 56 at its forward end made of tungsten carbide or other suitable cutting material. The tip 56 is, of course, ground to form the cutting edge of the tool. The shank 54 is threaded throughout the major portion of its length and its rear terminal portion 57 is snugly slidable in the bore 32. In addition, the shank portion 57 has key means comprising a pair of radially outwardly extending keys 58 at its rear end, which are slidable in the keyways 38. The shank 54 is also provided with an internally threaded axially extending bore 60 at its rear end for the reception of a locking screw 62 having a head 64 engageable with a washer 70. The washer 70 seats against the shoulder 34 of the bushing 22, which provides a thrust surface taking the force with which the collar 48 is drawn down against the seat 30 by the tightening of the screw 62.

Axial adjustment of the shank 54 and its tip 56 is effected by loosening the screw 62 and thereafter rotating the adjusting collar 48. In view of the fact that the shank 54 is held against rotation by the interfitting keys 58 and keyways 38, it can only move along its axis relative to the collar 48 when the collar is rotated. The head 64 of the screw 62 is provided with a socket 72 of polygonal cross section for the reception of a so-called Allen wrench, whereby the screw 62 may be rotated. It will be observed that the opening 45 of the screw 40 is of larger diameter than the socket 72, thus permitting the passage of a wrench through the opening 45 and into the socket 72 with the screw 40 in place. After an adjustment of the shank 54 has been made, the screw 62 is re-tightened to clamp the collar 48 against its seat 30. Both the collar 48 and the face of the bushing 22 are graduated to aid in the accurate adjustment of the shank 54. It will be appreciated that for a given thread lead the lineal movement of the shank 54 is a direct function of the degree of rotation of the collar 48, thus permitting the marking of shank adjustment dimensions on the collar 48.

The bushing 22 is intended to be seated against the seat 16 in the same angular position each time it is installed. For this purpose, an axially extending keyway 74 is milled in the outer periphery of the bushing 22 adjacent its forward end. A key member 76 is held in position within a slot 78 of the boring bar 10 by means of a screw 80 to project into the keyway 74. The key member 76 does not interfere with the axial insertion and withdrawal of the bushing 22, yet it insures a constant angular positioning of the bushing 22.

A tool of the present invention is particularly adapted for usage in applications where the cutting edge of the tip 56 is preset or ground to a desired dimension or position in a location removed from the boring bar 10. For this purpose, a special fixture (not shown) is used, which incorporates an opening and seat arrangement identical to that of the opening 14 and seat 16. If desired, another boring bar, identical to the bar 10, may be used. The configuration of the fixture, apart from its opening and seat, would be selected in accordance with the particular equipment with which the tip 56 is to be ground or measured. In any case, after the shank 54 is locked in the selected position in the bushing 22, the bushing 22 is removed from the fixture and installed in the boring bar 10. When the tool is ground or adjusted in the fixture, the bushing 22 is locked in position by the screw 40, which permits locking and unlocking of the screw 62 by the passage of a wrench therethrough.

It has been discovered that the use of a bushing 22 having a seating surface possessing a relatively slow taper provides a maximum degree of accuracy and precision. For example, the seat 16 and surface 24 of the structure illustrated herein converge at a 20 degree included angle of taper. It has been found that angles of taper less than 16 degrees or 17 degrees included angle or of less than 3½ inches per foot result in stickiness and prevent the ready removal of the bushing 22 from the opening 14. Thus, the selected 20 degree taper is somewhat greater than an angle at which difficulty would be encountered in removing the bushing 22. However, it is still a slow enough taper to afford highly accurate axial alignment of the shank 54 and its tip 56. On the other hand, the adjusting collar 48 and its surface 50, which mates with the seat 30 of the bushing 22, possess a "fast" angle of taper in which, in the illustrated embodiment, is a 90 degree included angle. This angle is highly advantageous in use. It occupies a minimum amount of space; it permits the collar 48 to be conveniently rotated without excessive friction or drag between the bearing surfaces; and it permits the collar to be removed readily from its seat. Thus, the angle of each of the conical seating surfaces is highly desirable for its intended function. It will be seen that when the screw 62 is tightened and the shank 54 is locked in a given position with its tip 56 in a selected, accurately measured position with respect to the surface 50, the bushing 22 may be transferred from the presetting fixture to the bar 10 without any possible error resulting from inaccuracies in the adjusting mechanism carried by the bushing 22. For example, all errors resulting from tolerances between the threads of the collar 48 and the shank 54, all errors resulting from the lack of concentricity of the collar surface 50 and its seat 30, and all inaccuracies resulting from the fit between the rear end of the shank 54 and the bore 32, including the fit between the keys 58 and their keyways 38, are eliminated. The position to which the tip 56 has been ground or preset will be accurately duplicated on the bar 10 by the very accurate fit between the surface 24 and seat 16 and the interfitting key member 76 and keyway 74.

While it will be apparent that the preferred embodiment herein illustrated is well calculated to fulfill the objects above stated, it will be appreciated that the invention is susceptible to modification, variation and change without departing from the proper scope or fair meaning of the subjoined claims. For example, a variety of tools could be carried by the bushing 22 and not just the particular assembly illustrated herein.

What is claimed is:

1. A metal cutting tool including a tool holder having an opening provided with a conical seat and a shoulder facing in a direction opposite from the direction of divergence of said seat, a bushing having a seat and a threaded portion, a conical surface on said bushing engageable with the conical seat of said tool holder, an elongated externally threaded cutter element having a cutter at one end thereof carried within said bushing, a collar threaded on said cutter element and engageable with the seat of said bushing, a threaded fastener engageable with the end of said cutter element opposite from the end thereof having said cutter and cooperable with said bushing to draw said collar against the seat of said bushing, and a threaded fastener threadably engageable with the threaded portion of said bushing and cooperable with said shoulder to draw said bushing against the seat of said tool holder.

2. The structure set forth in claim 1 including means for preventing rotation of said cutter element in said bushing while permitting axial movement of said cutter element relative to said bushing whereby the cutter of said cutter element may be adjusted linearly by rotation of said collar.

3. A metal cutting tool including a tool holder having an opening provided with a conical seat at one end thereof and a shoulder adjacent the other end thereof, a bushing carried in said opening having an exterior conical surface conformably engageable with the seat of said tool holder and a threaded portion disposed coaxially with the axis of said conical surface, said bushing having an internal conical seat at one end thereof, an elongated cutter element having a cutter at one end thereof, a collar threaded on said cutter element and having a conical surface conformably engageable with the conical seat of said bushing, cooperating means on said cutter element and said bushing preventing rotation of said cutter element relative to said bushing while permitting axial movement of said cutter element in said bushing, a threaded fastener cooperable with said bushing and threadably engageable with said cutter element to draw said collar against the conical seat of said bushing, and a threaded fastener cooperable with said tool holder and threadably engageable with the threaded portion of said bushing for drawing said bushing in a direction parallel to axis of said conical seat against the conical seat of said tool holder.

4. A metal cutting tool including a tool holder having an opening provided with a conical seat at one end thereof and a shoulder adjacent the other end thereof, a bushing carried in said opening having an exterior conical surface conformably engageable with the seat of said tool holder and a threaded portion disposed coaxially with the axis of said conical surface, said bushing having an internal conical seat of a greater angle of taper than the conical seat of said tool holder, an elongated cutter element having a cutter at one end thereof, a collar threaded on said cutter element having a conical surface conformably engageable with the conical seat of said bushing, cooperating means on said cutter element and said bushing preventing rotation of said cutter element relative to said bushing while permitting axial movement of said cutter element in said bushing, a threaded fastener cooperable with said bushing and threadably engageable with said cutter element to draw said collar against the conical seat of said bushing, and a threaded fastener cooperable with said tool holder and threadably engageable with the threaded portion of said bushing for drawing said bushing against the conical seat of said tool holder.

5. A metal cutting tool including a tool holder having an opening provided with a conical seat at one end thereof, said conical seat having an included angle of taper of between 16 and 45 degrees and a shoulder adjacent the other end thereof, a bushing carried in said opening having an exterior conical surface conformably engageable with the seat of said tool holder and a threaded portion disposed coaxially with the axis of said conical surface, said bushing having an internal conical seat at one end thereof possessing an included angle of taper between 45 and 110 degrees, an elongated cutter element having a cutter at one end thereof, a collar threaded on said cutter element and having a conical surface conformably engageable with the conical seat of said bushing, cooperating means on said cutter element and said bushing preventing rotation of said cutter element relative to said bushing while permitting axial movement of said cutter element in said bushing, a threaded fastener cooperable with said bushing and threadably engageable with said cutter element to draw said collar against the conical seat of said bushing, and a threaded fastener cooperable with said tool holder and threadably engageable with the threaded portion of said bushing for drawing said bushing against the conical seat of said tool holder.

6. A metal cutting tool including a tool holder having an opening provided with a conical seat and a shoulder facing in a direction opposite from the direction of divergence of said seat, a bushing having a seat and a threaded portion, a conical surface on said bushing engageable with the conical seat of said tool holder, an elongated externally threaded cutter element disposed in said bushing having a cutter at one end thereof and a key at the opposite end thereof, an axially extending keyway in said bushing receiving said key to prevent rotation of said cutter element while permitting axial movement thereof, a collar threaded on said cutter element engageable with the seat of said bushing, a threaded fastener engageable with the end of said cutter element adjacent said key and cooperable with said bushing for drawing said collar against the seat of said bushing, and a threaded fastener threadably engageable with the threaded portion of said bushing and cooperable with said shoulder to draw said bushing against the seat of said tool holder.

7. A metal cutting tool including a tool holder having an opening provided with a conical seat and a shoulder facing in a direction opposite from the direction of divergence of said seat, a bushing having a seat at one end thereof and an internally threaded sleeve portion at its opposite end, an exterior conical surface on said bushing engageable with the conical seat of said tool holder, an elongated externally threaded cutter element having a cutter at one end thereof carried within said bushing, a collar threaded on said cutter element engageable with the seat of said bushing, a threaded fastener threadably engageable with the end of said cutter element opposite from the cutter thereof and cooperable with said bushing for drawing said collar against the seat of said bushing, and a screw threaded into said sleeve portion and cooperable with said shoulder for drawing said bushing against the conical seat of said tool holder.

8. A metal cutting tool including a tool holder having an opening provided with a conical seat and a shoulder facing in a direction opposite from the direction of divergence of said seat, a bushing having a seat at one end thereof and an internally threaded sleeve portion at its opposite end, an exterior conical surface on said bushing engageable with the conical seat of said tool holder, an elongated externally threaded cutter element having a cutter at one end thereof carried within said bushing, a collar threaded on said cutter element engageable with the seat of said bushing, a threaded fastener engageable with said cutter element at the end thereof opposite from said cutter, said threaded fastener having tool receiving means for effecting rotation of said threaded fastener, and a screw threaded into said sleeve portion and cooperable with said shoulder to draw said bushing against the conical seat of said tool holder, said screw having an axially extending opening therethrough for the reception of a tool for rotating said screw, said opening being of a size sufficient to provide access therethrough of a tool engageable with the tool receiving means on said threaded fastener.

9. A metal cutting tool including a tool holder having an opening provided with a conical seat and a shoulder facing in a direction opposite from the direction of divergence of said seat, a bushing having a seat and a threaded portion, a conical surface on said bushing engageable with the conical seat of said tool holder, an elongated externally threaded cutter element having a cutter at one end thereof carried within said bushing, a collar threaded on said cutter element engageable with the seat of said bushing, a first threaded fastener engageable with the end of said cutter element opposite from said cutter and cooperable with said bushing for drawing said collar against the seat of said bushing, said first threaded fastener having tool receiving means at one end thereof for effecting rotation thereof, and a second threaded fastener threadably engageable with the threaded portion of said bushing and cooperable with said shoulder for drawing said bushing against the conical seat of said tool holder, said second threaded fastener having an opening extending axially therethrough provided with tool receiving means for effecting rotation thereof, said axially extending opening being of a size sufficient to provide access for a tool engageable in the tool receiving means of said first threaded fastener.

References Cited by the Examiner
UNITED STATES PATENTS 2,558,815   7/1951   Briney.

FOREIGN PATENTS 572,970   3/1959   Canada.
713,620   11/1941   Germany.
685,039   12/1952   Great Britain.

WILLIAM W. DYER, Jr., *Primary Examiner.*